Oct. 23, 1951  I. S. LOVEGROVE  2,572,640
VACUUM FILM HOLDER
Filed Aug. 18, 1948  3 Sheets-Sheet 1

Inventor
Irving S. Lovegrove
Thomas A. Jenckes
Attorney

Oct. 23, 1951     I. S. LOVEGROVE     2,572,640
VACUUM FILM HOLDER

Filed Aug. 18, 1948     3 Sheets-Sheet 2

Inventor
Irving S. Lovegrove
Thomas A. Jenches
Attorney

Oct. 23, 1951     I. S. LOVEGROVE     2,572,640
VACUUM FILM HOLDER

Filed Aug. 18, 1948     3 Sheets-Sheet 3

Inventor
Irving S. Lovegrove
Thomas A. Jenckes
Attorney.

Patented Oct. 23, 1951

2,572,640

UNITED STATES PATENT OFFICE 2,572,640

VACUUM FILM HOLDER

Irving S. Lovegrove, Providence, R. I.

Application August 18, 1948, Serial No. 44,932

3 Claims. (Cl. 248—362)

My invention relates to improvements in vacuum film holders and comprises such a holder adapted to firmly retain all portions of any size film against the surface of the front plate thereof. It is designed primarily for use in cameras employed in the graphic arts for holding sensitized photographic materials, films, glass plates, paper or thin metal sheets in the perfectly flat focal plane of the camera lens.

When used in conjunction with the conventional half-tone screens, the material is held parallel at any screen separation desired. It is also unusually well suited for use with the new magenta contact half-tone screens, as the screen is held in perfect contact with the sensitized material. It also can hold copy to be photographed in place of the conventional copy board, to act as a holder replacing the usual easel in making photographic enlargements, and it is particularly adapted for these purposes, as no covered glass, tacks or binding tape are required.

A further object of my invention is to provide a master controlled vacuum holder which is very light in construction. The front and back plates are preferably made of light weight metal such as aluminum or magnesium alloy, the intermediate plate preferably comprising a gasket made of pressboard or sheet plastic cemented between the front and back plates and the dial may comprise machined red plastic in which the calibrations of the dial are clearly engraved and filled with a suitable black enamel. Under the usual operating conditions, a red or orange colored light illuminates the photographic dark room and under this color light such a dial is clearly visible to the operator, appearing as a while dial with black calibrations which may be easily read and adjusted in the dark room to the desired setting.

A further object of my invention is to provide a master controlled vacuum film holder which, due to its master control and the elimination of a multiplicity of features formerly thought necessary in the art, is of very light weight, compact and can be mounted on various types of cameras by various means without imposing undue strain on the equipment.

A further object of my invention is to provide a film holder which, due to its simplicity, may be quickly attached to any camera.

A further feature of my invention comprises the fact that I employ on the rear surface of the front plate similar different sized endless rectangular nested channels having preferably equally spaced perforations therein to retain films of different size thereon against the front surface of the front plate, and that as the size of the film increases, I apply vacuum cumulatively to all of the channels covered by the film. Due to the fact that the front plate applies suction to the film along even lines, it is obvious that it will be held evenly throughout the area thereof. So far as I am aware, I am the first to provide a master control which applies suction along a plurality of different sized endless rectangular nested channels cumulatively.

A further feature of my invention relates to the specific construction of master control, preferably a dial control I preferably employ for applying suction to said channels cumulatively.

A further feature of my invention relates to the improved brace I preferably employ which positively maintains all portions of the holder flat in use.

These and such other objects of my invention, as may hereinafter appear will be best understood from a description of an embodiment thereof such as is shown in the accompanying drawings.

In the drawings, Fig. 1 is a front elevation of my improved vacuum film holder in use in the act of holding a film against the front surface thereof, showing a portion of the film only in elevation and with major portions of the front plate and gasket successively removed.

Figures 1, 2:
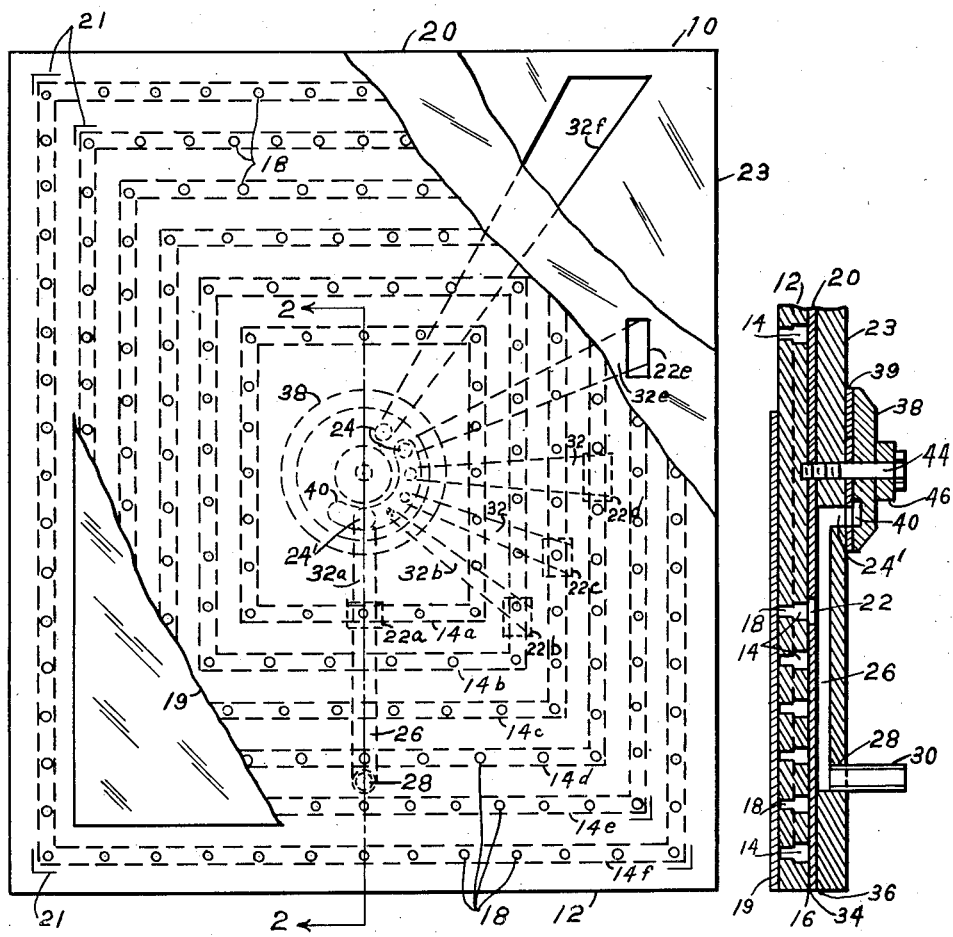
Fig. 2 is a cross sectional view taken along the line 2—2 of Fig. 1.
Figure 3:
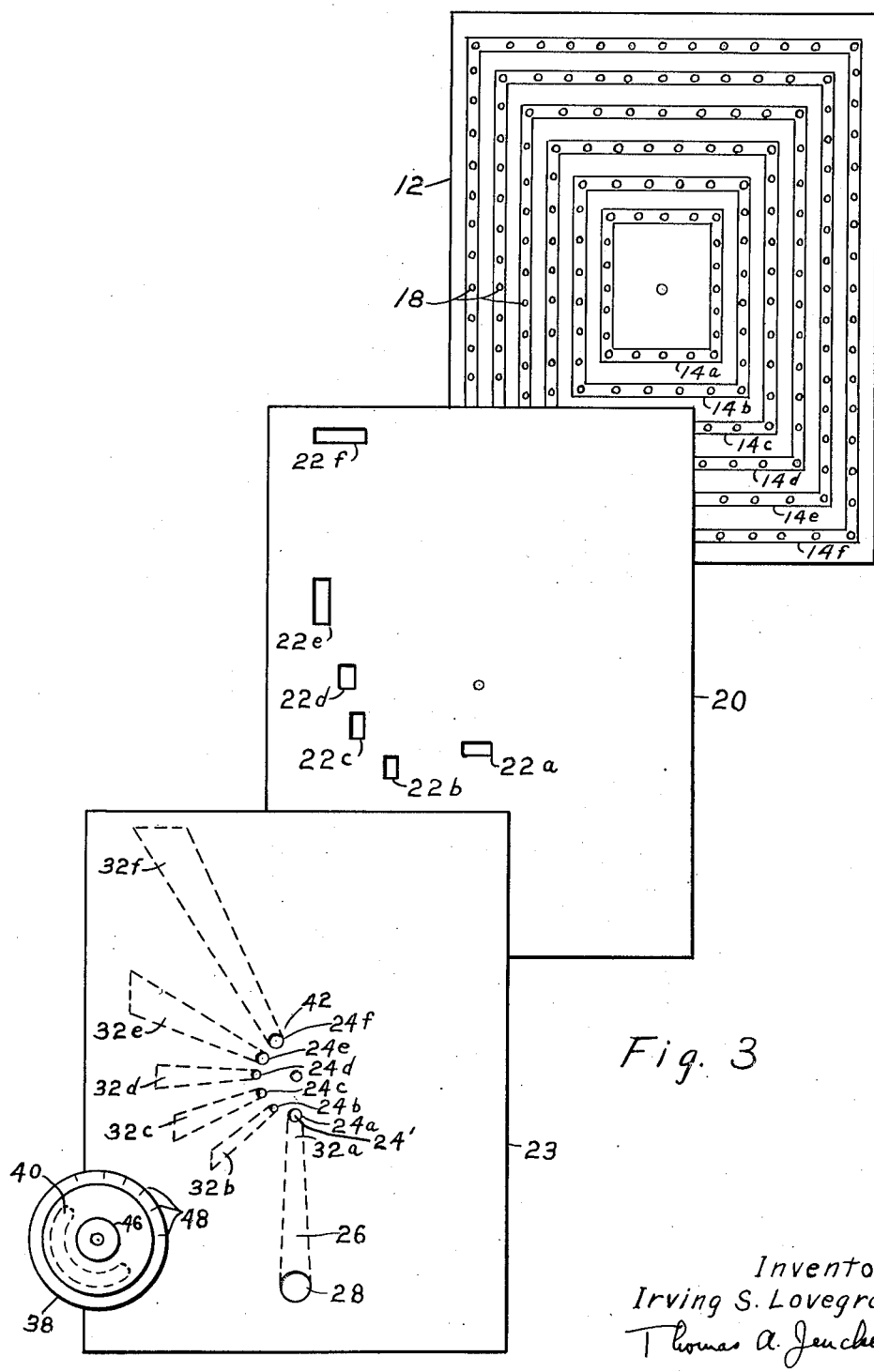
Fig. 3 is a rear exploded diagrammatic perspective view of the front plate, gasket, back plate and turning dial.

In the drawings, wherein like characters of reference generally indicate like parts throughout, 10 generally indicates a single master control vacuum film holder constructed in accordance with my invention. Broadly, said film holder 10 comprises a front plate 12, having a series of similar different sized endless rectangular nested channels 14, comprising respective channels 14a, 14b, 14c, 14d, 14e and 14f in the rear surface 16 thereof, said endless channels being of respectively less size than standard film sizes, if desired. I provide preferably evenly spaced perforations 18 in each respective channel extending to the front surface of said front plate to provide equal strong lines of suction along said aligned perforations sucking against the film 19 in the form of said similar nested channels respectively.

I also provide an intermediate plate 20 of substantially equal area underlying the said front plate 12, having spaced slot means 22 comprising respective slots 22a, 22b, 22c, 22d, 22e and 22f, each respective slot underlying portions of each respective channel 14a–14f in the front plate 12.

I also provide a back plate 23 of substantially equal area underlying said intermediate plate 20, having aligned holes 24 preferably of respectively increasing size therethrough, an entry channel 26 in the front surface thereof extending from an end hole 24' and receiving through another hole 28 in the back plate, said hole being preferably provided with a hose connection 30 thereto and channels 32, comprising respective channels 32a, 32b, 32c, 32d, 32e and 32f, preferably of increasing length and width, on the front surface thereof, leading from said respective holes 24a, 24b, 24c, 24d, 24e and 24f to said respective intermediate plate slots 22a, 22b, 22c, 22d, 22e and 22f to discharge respectively into respective outer endless channels 14a–14f in said front plate 12.

I also provide continuous layers of adhesive 34 and 36 respectively joining said intermediate plate 20 to said front plate 12 and to said back plate 23 and sealing the respective channels in said plates from each other and the outer edge.

I also provide means movably mounted on the rear surface of said back plate, such as the dial 38 shown, and having the slot 40 in the front surface thereof of a length corresponding to the distance from the leading hole 24a to the end hole 24f of said aligned holes in said back plate, movable to successively uncover said holes to apply suction cumulatively to said respective channels on movement thereof.

In the preferred embodiment shown, said movable means is preferably constructed as follows: The front plate 12 is preferably constructed of a light metal one-eighth inch plate, preferably of aluminum or magnesium alloy, because of their light weight, and the back plate 23 is preferably constructed of similar material of the same thickness, although it is obvious that light steel, plastic or other suitable material may be employed.

The intermediate plate 20 preferably comprises a gasket and may be made of pressboard or sheet plastic of about .015" thickness, although this plate may be constructed of metal, if so desired.

Any suitable type of adhesive such as glue, rubber cement, etc., to join said plates respectively to each other may be employed, but I have obtained the best results by the use of shellac.

I preferably make the aligned holes 24 of the back plate 23 of slightly increasing respective size, as shown. In the embodiment shown, as said movable means 38, I preferably employ the rotatable dial 38 shown. For this purpose, the slots 22a–22f in the intermediate gasket plate 20 are preferably both circumferentially and radially spaced to project outwardly from the respective holes 24a–24f in the back plate 23 arranged in the embodiment shown substantially in a semi-circular arc 42 adjacent the center thereof respectively in alignment with the gasket slots 22a–22f. In the embodiment shown, to save a separate channel 32a, the channel 26 leading from the entry hole 28 to the leading hole 24' or 24a is made to function as the channel 32a for the initial slot 22a by locating the slot 22a in the path of said channel 26.

The channels 32a–32f are arranged in clockwise formation to discharge respectively at the respective slots 22a–22f and as the respective channels 14a–14f are of respectively increasing size successively from the center to the outer edge of said device, it is obvious that they are of more area and so for this reason, as stated, the respective holes 24a–24f are preferably of respectively increasing size and the respective channels 32a–32f are of respectively increasing width to provide a greater area for easy flow, as well as of increasing length.

In the embodiment shown, the dial 38 comprises a circular dial mounted preferably centrally of the rear surface of said back plate by means of a suitable bolt 44 extending through a suitable hole in the dial and into threaded holes in the back plate 23, gasket 20 and front plate 12, so that the dial 38 may turn on the respective unthreaded rear portion thereof. The dial 38 may have a turning knob 46 projecting rearwardly therefrom and I provide indicia 48 preferably comprising numbers corresponding to the respective endless channels 14a–14f in said front plate arranged arcuately on a portion thereof, in the embodiment shown on the opposite side from the slot 40. The slot 40 is preferably made of arcuate formation on the front surface of said dial on the opposite side thereof from said indicia of a length corresponding to the arcuate distance 42 of the outermost gasket slot 22f from the leading innermost gasket slot 22a and corresponding holes 24f–24a and channels 14f–14a to successively uncover said holes in synchronism with their respective indicia to successively apply suction cumulatively to said respective channels depending upon the size of film employed.

Figure 4:
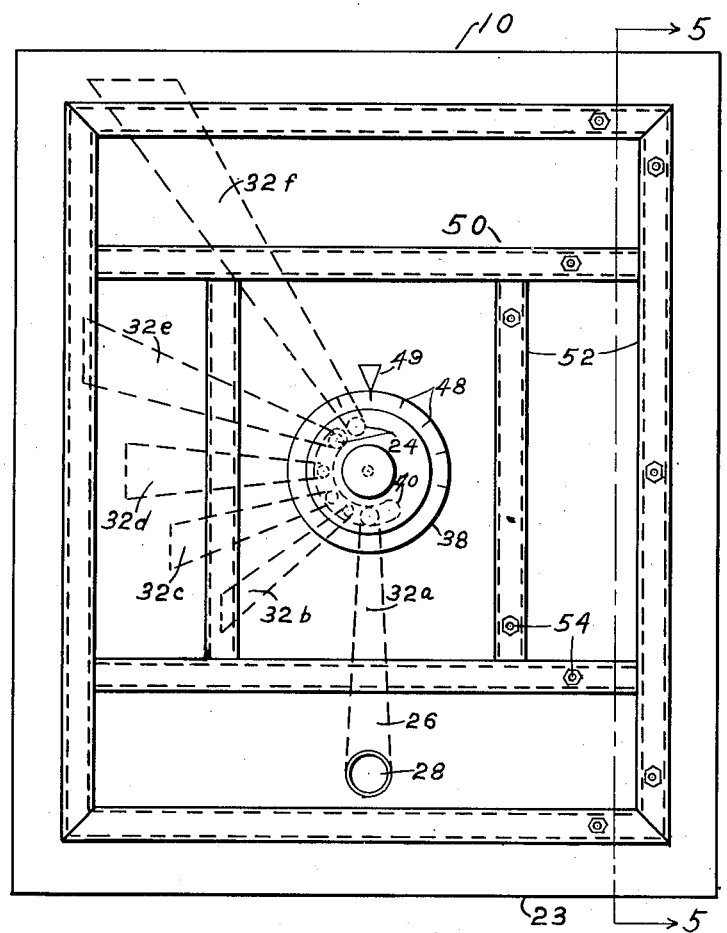
Fig. 4 is a rear elevation of my improved holder, illustrating the brace I preferably employ therefor.
Figure 5:
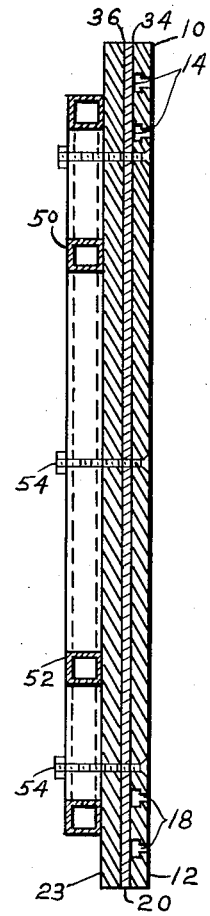
Fig. 5 is a sectional view thereof taken along the line 5—5 of Fig. 4.
Figure 6:
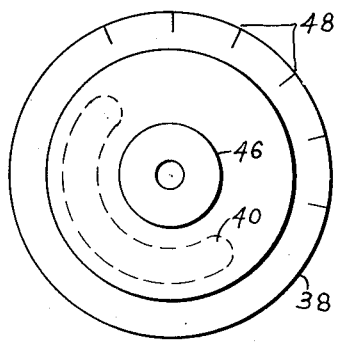
Fig. 6 is a rear view of the improved turning dial I preferably employ.
Figure 7:
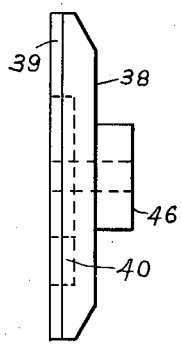
Fig. 7 is a side elevation of the turning dial shown in Fig. 6.

I may, if desired, provide a reinforcing skeleton brace 50, as shown in Figs. 4 and 5, comprising square metal tubing 52 underlying said back plate in any suitable skeleton arrangement such as the rectangular skeleton arrangement shown and secured to the holder 10 by machine screws 54 extending through suitable holes therein, through suitable holes in said back plate, intermediate plate and front plate to retain the parts of the film holder flat in use.

The dial 38 is preferably machined from red plastic, the calibrations are clearly engraved and preferably filled with a suitable black enamel. Under usual operating conditions, a red or orange colored light illuminates the photographic dark room. Under this color light, the dial is very clearly visible to the operator, appearing as a white dial with black calibrations and this is more easily read and adjusted in the dark room to the desired setting. The front surface of the front plate is as flat and as smooth as possible and is preferably finished in black. The remainder of the holder may be finished in any color, but is usually black or gray. As my device is of very light weight and compact, it may be readily mounted on various cameras by various means without imposing undue strain on the equipment. Any number of channels 14 may be provided in the front plate in place of the six shown. These are preferably cut to a depth not more than one-half the thickness of the plate. The area enclosed by each channel is approximately the size of standard photographic films and plates, being preferably of slightly less area. The respective holes 18 are suitably spaced in the channels 14, preferably evenly and are of a suitable diameter to prevent embossing of the film. Red marks, as indicated by the corners 21 shown, are placed at each corner of each area to aid in the placing of the film 19. All channels 32 in the back plate are cut to a depth of not more than one-half the thickness of the metal. The setting of the dial 38 determines how many channels 14 are to be used, since all areas are used up to and including the largest area selected. The film 19 is held securely against the front plate 12 by vacuum, suction being drawn through the perforations 18, through the channels 14 of the front plate, through the slots 22 in the intermediate plate, through the channels 32 in the back plate, through the holes 24 therein, through the arcuate slot 40 in the dial 38 and through the hole 24' or 24a as shown, through the main channel 26, 32a as shown, through the hole 28 and hose connection 30 to the vacuum pump or other source of suction (not shown). To prevent leakage of vacuum a piece of felt 39 may be cemented to the front side of the dial 38. It is apparent that the use of small machine screws 54 extending through the tubing 52 to the front plate 12 aids the layers of adhesive 34 and 36 to maintain an airtight seal between the plates 12 and 23. It is obvious that any other type of a skeleton brace 50 than that shown may be employed, but that the use of such a brace is highly desirable as the holder must maintain a perfect plane throughout its entire life.

In addition to the indicia 48, a pointer 49 may be mounted on the rear surface of the back plate opposite said indicia.

The operation of my invention is apparent from the above description. The operator selects the standard size film 19 required, sets the dial valve 38 by rotating it to the desired position indicated by the indicia 48 to allow vacuum in the required number of channels 14a–14f successively through the outer channel adjacent the film on the front plate over the corresponding area marked by the indicia 48, starts the vacuum pump, exposes the film, turns off the vacuum and removes the film. By the use of a vacuum gauge and a pressure control valve in the hose line, any amount of vacuum can be applied as desired by the operator.

It is apparent that I have provided a novel type of master control vacuum film holder of a light construction and one which may be quickly operated in use, with the other advantages described above.

It is understood that my invention is not limited to the specific embodiment shown and that various deviations may be made therefrom without departing from the spirit and scope of the appended claims.

What I claim is:

1. A vacuum holder for sheet material comprising a front plate and a back plate with a plurality of nested channels between said plates having adjacent entrance openings arranged to terminate in a sequence corresponding to said nested channels, means communicating said channels with the surface of the front plate, a vacuum conduit, means including a movable member having a cavity communicating in all positions with said conduit and selectively positionable over one or more of said openings to successively communicate the inner channel opening and additional openings progressively outwardly therefrom as the position of the member is moved.

2. A vacuum holder as in claim 1 wherein the member is pivoted to rotate about a center and the terminus of the entrance openings are arcuately arranged.

3. A vacuum holder as in claim 1 wherein the nested channels are formed by cavities in the back surface of the front plate.

IRVING S. LOVEGROVE.

REFERENCES CITED

The following references are of record in the file of this patent:

UNITED STATES PATENTS

| Number | Name | Date |
|---|---|---|
| 1,717,012 | Dixon | June 11, 1929 |
| 1,910,753 | Colvin | May 23, 1933 |
| 1,945,481 | Dilkes | Jan. 30, 1934 |
| 1,945,493 | Martindell | Jan. 30, 1934 |
| 2,133,518 | Huebner | Oct. 18, 1938 |
| 2,317,348 | Wekeman | Apr. 27, 1943 |
| 2,425,921 | Crockett | Aug. 19, 1947 |